US007353246B1

(12) United States Patent
Rosen et al.

(10) Patent No.: US 7,353,246 B1
(45) Date of Patent: Apr. 1, 2008

(54) SYSTEM AND METHOD FOR ENABLING INFORMATION ASSOCIATIONS

(75) Inventors: James S. Rosen, New York, NY (US); Christopher M. Putnam, Montclair, NJ (US); Thomas A. Schmitter, New York, NY (US); Daniel Torop, New York, NY (US)

(73) Assignee: Miva Direct, Inc., New York, NY (US)

( * ) Notice: Subject to any disclaimer, the term of this patent is extended or adjusted under 35 U.S.C. 154(b) by 407 days.

(21) Appl. No.: 09/628,880

(22) Filed: Jul. 31, 2000

Related U.S. Application Data

(60) Provisional application No. 60/146,469, filed on Jul. 30, 1999.

(51) Int. Cl.
*G06F 15/00* (2006.01)
*G06F 13/10* (2006.01)

(52) U.S. Cl. .................. 709/202; 709/217; 709/223; 707/10; 715/513

(58) Field of Classification Search ............. 709/202, 709/203, 206, 224, 225, 229, 236, 219, 226, 709/217, 223; 345/619; 713/202; 707/10, 707/3, 103; 705/26; 715/513
See application file for complete search history.

(56) References Cited

U.S. PATENT DOCUMENTS

| | | | | |
|---|---|---|---|---|
| 5,606,602 A | * | 2/1997 | Johnson et al. | 379/114.02 |
| 5,819,092 A | * | 10/1998 | Ferguson et al. | 717/113 |
| 5,832,212 A | * | 11/1998 | Cragun et al. | 713/202 |
| 5,835,722 A | * | 11/1998 | Bradshaw et al. | 709/225 |
| 5,881,131 A | * | 3/1999 | Farris et al. | 379/15.03 |
| 5,905,863 A | * | 5/1999 | Knowles et al. | 709/206 |
| 5,907,680 A | * | 5/1999 | Nielsen | 709/228 |
| 5,958,016 A | * | 9/1999 | Chang et al. | 709/229 |
| 6,154,738 A | * | 11/2000 | Call | 707/4 |
| 6,199,099 B1 | * | 3/2001 | Gershman et al. | 709/203 |
| 6,336,117 B1 | * | 1/2002 | Massarani | 707/100 |
| 6,356,905 B1 | * | 3/2002 | Gershman et al. | 707/10 |
| 6,507,872 B1 | * | 1/2003 | Geshwind | 709/236 |
| 6,516,337 B1 | * | 2/2003 | Tripp et al. | 709/202 |
| 6,552,732 B1 | * | 4/2003 | Davis et al. | 345/619 |
| 6,618,747 B1 | * | 9/2003 | Flynn et al. | 709/206 |
| 6,981,040 B1 | * | 12/2005 | Konig et al. | 709/224 |

* cited by examiner

*Primary Examiner*—Khanh Dinh
(74) *Attorney, Agent, or Firm*—Weingarten, Schurgin, Gagnebin & Lebovici LLP

(57) ABSTRACT

A system and method for enabling information associations which parses objects contained within a document such a Web page, in order to form a list of "metalink" objects within the document for which related information may be available. Visual indications of metalink objects within the document may be provided automatically, or in response to a user action requesting such indications be made, and may include any kind of modification to the visual display of the metalink objects or to the cursor as it is moved over or near the metalink objects. User selection of a metalink object, for example clicking on the display of a metalink object, is further detected. In response to such user selection of a metalink object, a database is searched for information related to the selected metalink object, including pointers or links to other documents. The search results ("metadata") are then displayed, for example in a pop-up window. Metadata may be weighted in terms of their perceived relevancy to a user of the local system, or to a group of users spread across multiple systems, or to all users, based on monitoring of activities performed on one or more client systems by client side software.

53 Claims, 7 Drawing Sheets

CAN THE WORLD WIN AGAINST KASPAROV 

Laughter is the best medicine.

SEACH ARCHIVES SITE GUIDE CONTACT US NEWSLETTER AD INFO MEMBERSHIP SHOP

salon.com

SITES
- Arts & Entertainment
Books
Comics
Health & Body
Media
Mothers Who Thinks
News
People
Technology
Travel
Columnists

----

Search Salon

[ Search ]

Advanced Search | Help

----

Table Talk
[Salon's freewheeling discussion area]

She may have a glue gun and her own show; but she's no Martha Is Katie Brown's show a good thing?

Video killed the radio star Can a music video make or break a song?

Did Jobim know

Arts & Entertainment
Thursday, July 29, 1999

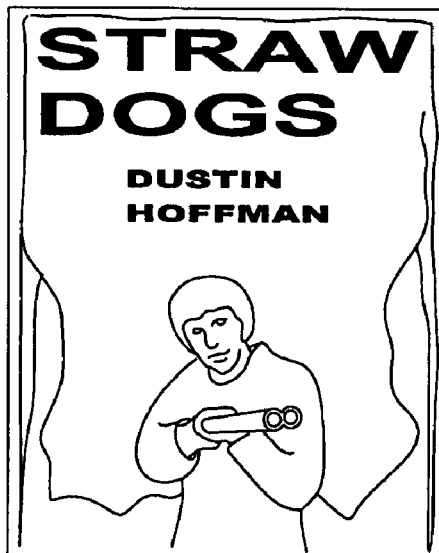

- Eyes opening up Flip Sam Peckinpah's "Straw Dogs" into the VCR after dozing through Stanley Kubrick's valedictory and it registers the shock pads on failed hearts in medical shows— suddenly, you can feel again.
By Micheal Sragow [07/29/99]

- Sharps & Flats The Holy Modal Rounders are old-time counterculture folkies in form, but they're not afraid to toss a pie in the face of tradition.
By Andrew Hamlin [07/29/99]

- Arts & Entertainment Log Woodstock 99 : Three days of peace, love and rape. Rape accounts emerge in wake of music festival.
By Bill Wyman [07/29/99]

 VISA

The Preffered Card of Salon.com

----

Salon's Network Sponsers:
----

[ BARNES & NOBLE ]

[ Ameritrade ]

----

Salon.com Shopping

Politics + Pop Culture + Free Trial = Enews.com

----

Membership

Not a Salon.com member? Join now

----

Summer blowout in Salon Shopping

*FIG. 4*

SYSTEM AND METHOD FOR ENABLING INFORMATION ASSOCIATIONS

CROSS REFERENCE TO RELATED APPLICATIONS

This application claims priority under 35 USC §119(e) to provisional application Ser. No. 60/146,469, entitled "System and Method for Enabling Information Associations", and filed Jul. 30, 1999.

STATEMENT REGARDING FEDERALLY SPONSORED RESEARCH OR DEVELOPMENT

N/A

BACKGROUND OF THE INVENTION

The present invention relates generally to systems for associating information objects together, and more specifically to a system and method for providing a "metalayer" of links and/or information for use in connection with the World Wide Web.

The growth of the World Wide Web ("Web"), generally thought of as those resources and users on the Internet using the Hypertext Transfer Protocol (HTTP), has been tremendous. Content information is organized on the Web in what are referred to as "Web pages." As it is generally known, a typical Web page contains a multiplicity of words, phrases, graphics, and other objects (henceforth called just "objects"), some of which are associated with what are known as "hyperlinks" or "links" to other Web pages. One of the powerful aspects of the Web is that users can go from one Web page to another, following links as they choose, in a non-linear and unpredictable way. In existing systems, this is made possible by the designers of Web pages selectively assigning links to words, phrases, graphics, and other objects on their Web pages, for example through use of "href" HTML tags within HTML files describing those Web pages.

The ability to follow links that are embedded within the HTML code describing a Web page defines the Web experience provided by existing systems. However, such an approach may also hinder the user, in the sense that only certain objects within a given Web page, predefined by the designer of the Web page, are in fact linked to other Web pages. It would be desirable to shift some or all the responsibility for defining links for a given Web page from the Web page designer, to a user who has selected that Web page, and who may wish to choose from a richer and more current selection of related links.

For example, consider the case of a Web user who is looking for information relating to a certain topic. Such a user may be said to be "surfing" the Web. If the user has accessed a sports-related Web page, and is reading about a soccer player from Kosovo, the fact that the player is from Kosovo might trigger an association in the user's mind with the ongoing political unrest in that province of Yugoslavia. However, the sports-related Web page probably does not have a pre-defined link associated with the word Kosovo, nor to any Web page that focuses on the political situation there. In existing systems, if the user wants to explore this new train of thought, he might have to leave the sports-related Web page, go to a search engine, type in "Kosovo" as a search query, and thereby obtain a list of links related to Kosovo. Such a detour to a search engine could be time-consuming and inconvenient, and the user might therefore instead opt to postpone and potentially forget about his sudden interest in Kosovo.

Existing application programs which seek to enhance a Web user's surfing experience include ThirdVoice™ of ThirdVoice Inc., and products available from Hypernix Technologies, Ltd. ThirdVoice enables a user to post commentary relating to specific Web pages, without modifying the Web pages themselves, and without requiring permission of the Web sites at which the Web pages are located. ThirdVoice causes a caret to be displayed on top of existing content within a Web page, in order to indicate the presence of a message relating to that Web page. Users of Third-Voice's software can see and read each other's posted messages. Hypernix enables users of its software to chat with other users visiting the same Web site, without the Web site's involvement. While Hypernix and ThirdVoice system provide groups of users with the ability to enter and retrieve comments regarding specific content within a Web page, they fail to change the underlying model of Web browsing, which is based on following sets of predetermined links from Web page to Web page.

For the above reasons, it would be desirable to have a system for using the Web which liberates Web users from the present Web surfing scenario, in which a Web surfer looking to go from one Web page to another is forced to choose a link from among the subset of objects on the page that have predefined links.

BRIEF SUMMARY OF THE INVENTION

In accordance with principles of the invention, a system and method are disclosed for providing a layer of "super-content" above the existing layer of content on the Web, and which may be implemented by exploiting the use of client-side software running in tandem with a browser application program and a server component. The disclosed system and method enable information associations by parsing the objects contained within a document such as a Web page being downloaded by a browser program on a client system, in order to form a list of "metalinks" (also referred to as "metalink objects") within the document, for which related information may be available. The list of metalink objects may be formed by generating a unique object list for the document, and forwarding that list to a metadata server. The metadata server may then respond with a list of those objects within the list that are associated with related information. Those objects which are determined to have related information may then be considered metalinks. Alternatively, the client-side software may compare objects within the document with entries in a client-side data structure such as a dictionary, where each of the data structure entries represents at least one object for which related information is available. In general, objects for which related information is or may be available are referred to as "metalink" objects within the document.

The disclosed system may provide visual indications to a user of metalink objects within the document. Such visual indications of metalink objects may be provided automatically, or in response to a user action requesting such indications be made.

The disclosed system further operates to detect user selection of a metalink object in the document being displayed, for example when a user clicks on the display of a metalink object. In response to the user selecting a metalink object, the disclosed system initiates an object search by searching a database for information related to the selected metalink object. Such related information ("metadata") may include, for example, pointers or links to other documents. The related information is then displayed to the user, for example in a pop-up window referred to as the "metadata window." In response to user selection of one a data source indicated in the metadata window, the system causes the associated content (the "resource") to be retrieved and displayed, for example, in another window within the user interface of the local system.

The pop-up window used to display metadata is referred to herein as the "metadata window." A name of a piece of metadata displayed within the metadata window is referred to as a "data source", and the metadata itself is referred to as the associated "resource." Metadata may link directly to streaming audio/video or other multimedia content. When such metadata is selected by the user, the disclosed system may provide a separate window within which such multimedia content is presented to the user.

In another aspect of the disclosed system, the set of metadata provided to the user in response to selection of a metalink object is determined in part based on the user's past activities, the context within which the selection was made, or user profile information explicitly provided by the user to the system. In this regard, techniques such as Natural Language Processing (NLP) may be applied to determine contextual meaning associated with content that is currently being displayed, or that has been previously selected by the user. Such contextual meaning may consist of themes or topics related to the selected content. For example, information related to metalink objects may be weighted in terms of their perceived relevancy to a user of the local system, or to a group of users spread across multiple systems, or to all users. In such an embodiment, the client software of the disclosed system monitors a number of activities on the local system which approximate or suggest the interest level of a user in a document that is currently being displayed. Such monitored activities may include time spent with the document open, whether the user scrolled through the document, whether the user clicked on a link within the document, and other user actions. A rating may then be generated for that document within a specific context, and applied to future requests for information related to a metalink object. The contextual analysis, user profiling, and/or explicitly entered user preferences may further be used by the disclosed system to perform word disambiguation with regard to selected metalink objects, in order to provide metadata related to the most likely intended meaning of a word having multiple potential meanings. A frame on one side of the current user display may further be provided by the disclosed system which displays a list of metalinks that relate to the current context, user preferences, and/or user profile information.

The disclosed system empowers a user to pursue tangential interests while surfing through various Web pages. Instead of forcing the user to choose from a small subset of the words or phrases within a document that happen to be conventionally "linkable" objects, the disclosed system potentially makes virtually every object on a Web page linkable by associating every object with related "metadata". In addition to expanding the user's link options beyond the predefined subset of linkable objects for each page, the present invention further lets each object in a Web page have multiple target URLs within the related metadata. Web users can choose which of these multiple related links to pursue based on their specific goals.

In addition, the disclosed system is not limited to processing of Web pages, but is applicable to any and all documents which include parsable data. Such potential document types to which the disclosed system may be applied include electronic mail messages, word processing files, and others. Accordingly, while the below illustrative embodiments are described with reference to processing of Web pages, the present invention is not limited in application to source documents consisting of Web pages.

BRIEF DESCRIPTION OF THE SEVERAL VIEWS OF THE DRAWING

The invention will be more fully understood by reference to the following detailed description of the invention in conjunction with the drawings, of which:

FIG. 4 shows a Web page with illustrative metalinks underlined, in which a user has moved the cursor over one of the metalinks, whereupon the cursor has been changed from an arrow into a modified "hyperlink hand" to indicate that "Stanley Kubrick" is a metalink;

DETAILED DESCRIPTION OF THE INVENTION

The disclosures of provisional application Ser. No. 60/146,469, entitled "System and Method for Enabling Information Associations", and filed Jul. 30, 1999, to which this application claims priority under 35 USC §119(e), are hereby incorporated by reference herein.

Figure 1:
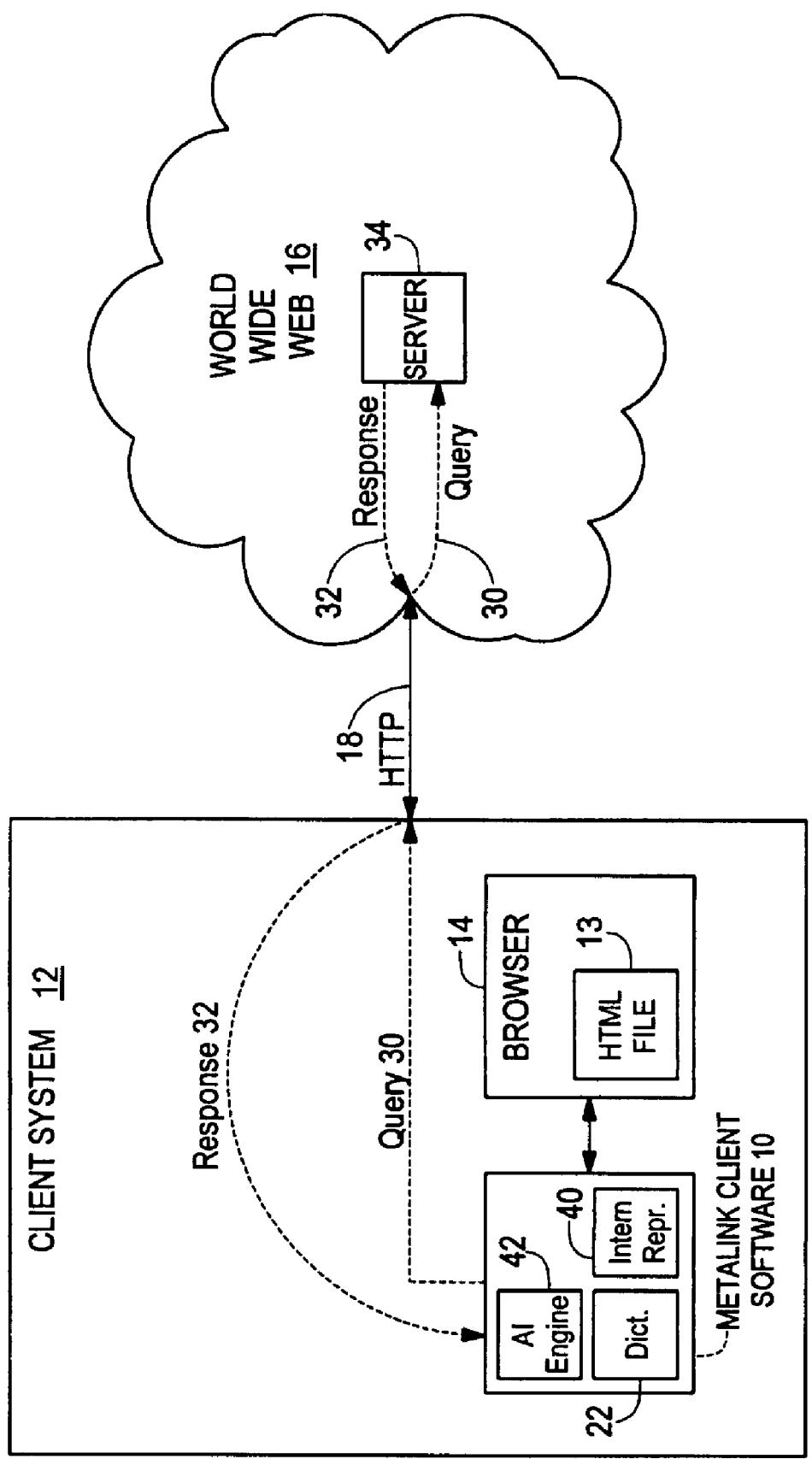
FIG. 1 is a block diagram showing an illustrative embodiment of the disclosed system.

As shown in the illustrative embodiment of FIG. 1, metalink associated client software 10 executes on the client system 12, and operates to parse some number of objects in an HTML or Wireless Markup Language (WML) file 13 being downloaded through a browser program 14 also executing on the client system 12. Objects may consist of words, phrases, graphics or other display objects. For example, in the case of graphics objects, the software 10 parses some or all associated text descriptors, for example as indicated by HTML "alt" tags in the HTML file 13. The client system 12 of FIG. 1 is further shown communicating over the World Wide Web 16 using HTTP 18 or WAP (Wireless Application Protocol). The client system 12 may include any hardware components suitable for providing a program code execution platform. Such a program code execution platform may consist of, for example, a personal computer, personal digital assistant (PDA), workstation, server, wireless device, or Web appliance. It will also be recognized by those skilled in the art that such conventional hardware components may include one or more processors for executing program code, a memory for storing program code for execution on the processors, and various input/output devices which may include secondary storage devices such as magnetic or optical disks and/or tape drives, and which may further include user interface devices such as a keyboard, mouse, stylus, and display monitor.

During operation of the illustrative embodiment shown in FIG. 1, in order to access metadata associated with a metalink in HTML file 13, the user may initiate a request for an object search in a variety of ways. For example, the user may initiate a request for an object search with regard to a metalink by moving the mouse over the metalink and leaving it there for some predetermined amount of time, by clicking on the metalink, by hovering over the metalink, by single or double clicking on a metalink, by using the right mouse button to open a metalinks window, and/or by some combination of these and/or other techniques. Similarly, the user may move the mouse in an identifiable way (e.g., three quick loops) to signal that they are interested in seeing any available metadata for a given object. Along these lines, the user may identify an object of interest within the current Web page by dragging the cursor over it with a mouse button depressed, thus causing it to be highlighted. Various other user interface mechanisms may be employed in connection with the disclosed system in order for the user to identify to the system one or more objects for which related metadata is desired, as may be appropriate for specific implementations.

As a result of a user request for metadata, the disclosed system generates a window (referred to as the "metadata window") displaying a set of related information (referred to as the "metadata"). The metadata within the metadata window may include the names of a number of pieces of metadata, referred to as "data sources." The actual pieces of metadata indicated by the data sources within the metadata window are referred to as "resources." The metadata window may also display information that is unrelated to the metalink, such as weather reports or advertisements, in addition to the related metadata. The user can then move the mouse over a desired data source within the metadata window, and click on it, thereby gaining access to the associated resource. For example, where a data source is a URL, clicking on the URL would direct the browser to download the HTML file describing the Web page indicated by the URL. Alternatively, some or all resources may be loaded automatically by the system, thereby not requiring that the user explicitly load them. Other display rendering engines may also be used to download resources indicated by data sources other than URLs in the metadata window. While the metadata window may consist of a pop up window as described above, the metadata window may alternatively consist of a side window or side frame within the user display.

Virtually any object may be a metalink. The disclosed system may be embodied, or may be configured by a user, such that all displayed objects are metalinks. In such an embodiment, the user may select any object that is displayed to be used as an input to an object search for related information. However, the disclosed system may also be configured or embodied to provide "suggestions" of objects which the user may wish to perform object searches with. Such suggestions may be based on (1) user profile information derived from past actions of the user, (2) user provided profile information, (3) user provided preferences, (4) contextual analysis of the currently displayed document, for example using natural language processing to extract themes contained in the current document or in a history of recently loaded documents, (5) the presence of related information and/or metalinks associated with certain objects. When the disclosed system suggests objects to the user for which object searches may be desirable, it may do so by "marking up" the current document to visually indicate the suggested objects. The specific style of markup may convey to the user information about the suggested object or its related information.

Various user actions may be employed to request that metalinks within the current display be visually indicated to the user. For example, a technique referred to herein as a "white click" may employed for this purpose. In an embodiment of the disclosed system employing the white click activation technique, when the user performs a mouse click on some portion of the display that is devoid of content, such as the margin of a document, the disclosed system will cause metalinks that are currently available to be visually indicated to the user. The disclosed white click technique advantageously enables the user to activate visual indications of metalinks without having to look for a specific associated button within the user display. However, a button or menu, for example, could also serve this function. The disclosed system may also be embodied using a right click to activate visual indication of currently displayed metalink objects, or using some combination of right click, white click, and/or other key strokes for this purpose. Additionally, the white click activation technique, or some other activation technique, such as a right click or "glick" (a particular pattern of mouse movement, such as three clockwise circles), may further be used to bring up a search query window, into which the user may explicitly enter a search string to be used by the disclosed system to search for related information.

Visual indications of metalink objects may include any kind of modification to the visual display of the metalink objects within a graphical user interface, including, but not limited to, changes in format, color, font, or style of the metalink object displays. The appearance and selection of metalink objects within the user display is user configurable. Accordingly, the user may, for example, indicate through some type of menu interface how metalink objects are to be visually indicated.

One technique for visual indication of metalink objects is through modification of the cursor image when the cursor is located relatively close to one or more metalink objects. Such changes in cursor image may be made in addition to or instead of changes in the visual appearance of the metalink objects themselves, which also may be made when the cursor is moved over or near a metalink object. In one illustrative embodiment, a "radius" of visual indication may be predefined or user configured. The radius of visual indication for a metalink object defines an area around a metalink which is "sensitized", such that when the cursor is moved by the user within the area, either the visual representation of the metalink object is modified to indicate that it is a metalink object, or the cursor itself is modified to indicate that it is located proximately to a metalink object. In this way, the visual indication of a metalink object may include modification of the display of the metalink object itself and/or modification of the cursor image.

In one such embodiment of the disclosed system, the user is notified that an object is a metalink object when client software causes the cursor to change to a predefined image, thus indicating the presence of available related information. For example, a special hand symbol, distinct from the hyperlink hand symbol used by existing browsers to indicate that an object is "hot", or linkable, may be employed for this purpose. Alternatively, the cursor may be modified to the hyperlink hand itself whenever it is over a metalink object. Moreover, an embodiment of the disclosed system may be provided which changes the style of an object in a Web page when metadata is or may be available for that object. Such style changing may include underlining and/or boldfacing of the object in a way that may or may not be distinctive from the default or page supplied styles for indicating hyperlinks.

Further, the user may expressly indicate to the disclosed system, for example through a menu type interface, a type or category of objects which should be visually indicated as metalinks. In this way, the user may configure a filter to be applied to the visual display of metalink objects. The markup style applied to each object can vary based on attributes of that object and/or the metadata related to that object. The markup style may then become "informational", in the sense that the style employed for a given object conveys information about that object itself, or the metadata related to that object. In general, the visual indication of metalink objects may be used to inform the user that a relatively "rich" set of related information is available for some objects within the current display.

The markup style applied to any metalink object may depend on attributes of that object. For example, all objects which are associated with concepts of a specific category (e.g. sports) may be marked up a particular way. Alternatively or in addition, the markup style may indicate that the related metadata is particularly salient given the object context (including the context defined by a history of viewed Web pages), or the user's explicitly or implicitly established profile. Alternatively, or in addition, the markup style may indicate that the related metadata is of particularly high quality or quantity, etc.

While the disclosed system may be embodied such that virtually every object on a Web page is indicated as being associated with metadata, a preferred alternative embodiment may be used in the usual case in which it is desirable to selectively choose which words, phrases, and/or other objects should be indicated as having related metadata associated with them. For example, it is usually unnecessary to associate such words as "and", "or", and "the" with metadata. Additionally, certain words or other objects may be determined to have a "richer" or "more relevant" set of related information than other objects within the same document. Furthermore, the metadata available for a given object may be considered relatively more interesting to the user based on the amount of such related information, or based on individual or collective user profiles developed by the system in response to activities of a single user or a group of users. Such user profiles may include explicitly entered preferences or profile information provided by a user or users to the disclosed system, and/or the results of contextual analysis of currently or previously selected documents. Various contextual analysis techniques may be employed, for example based on text analysis algorithms and techniques. Such a relevancy determination by the disclosed system may be used to determine which ones of the currently displayed objects are to be visually indicated to the user as metalinks.

Alternatively, or in addition, the disclosed system may determine the specific set of metalink objects which are to be visually indicated through monitoring of actions performed by the user. In this way the disclosed system may provide "suggestions" to the user, based on the users behavior pattern, of which objects may be associated with further information related to the user's past browsing pattern. In the absence of any filtering, the disclosed system may provide visual indication to the user of all currently visible objects for which related information is available. In general, the visual indication of metalink objects may be used to inform the user that a relatively "rich" set of related information is available for some objects within the current display.

In one embodiment, as illustrated in FIG. 1, the disclosed system may include a dictionary 22 of phrases, words, and other objects that are to be indicated as metalinks to the user. Such metalink objects may or may not have metadata relating to them. In such an embodiment, the software 10 parses the HTML file 13 to identify those objects within the HTML file 13 matching entries within the dictionary 22. The software 10 may further operate to "highlight", in some predetermined manner, for example by boldfacing and/or underlining in a color-coded fashion, the displays of any objects matching an entry in the dictionary 22. Additionally, or alternatively, the disclosed system may detect when the user moves the mouse over or near one of these metalink objects, and as a result cause the cursor to be changed to a predetermined image, such as a modified hyperlink hand image, in order to indicate to the user that there are or may potentially be metadata related to the object over which the cursor has been moved. The modified hyperlink hand image may in fact be related in some way to the nature of the metalink object. For example, a symbol or word may be used as a cursor that is associated with the word or phrase that is the metalink object, such as a cursor including a corporate logo when the cursor is located over or near the name of the associated corporation.

The client software 10 of FIG. 1 further detects if the user clicks on any of the metalink objects shown on the Web page. In response to a user clicking on a display of a metalink object, the software 10 sends an object query message 30 to at least one metadata server, shown in FIG. 1 as metadata server 34 on the Web 16. The object query 30 contains or identifies the object that was clicked on, referred to as the "query object", and that is to be the subject of an "object search" performed on the metadata server 34. The metadata server 34 then returns a response message 32 including the results of the object search, i.e., a set of metadata related to the query object. The software 10 may cause a separate "metadata window" to be displayed by the client system 12. For example, the metadata window may be formed above or near the display of the query object. Such a metadata window would contain a set of related metadata from among which the user could choose; clicking on any Data Sources within the metadata would send an instruction to the browser or other display device to open up the associated Web page or display the referenced multimedia content or other information resource. The metadata window may also include other information and/or fields, such as news headlines, advertisements, search engine interfaces, etc. Such supplemental information within the metadata window may be related or unrelated to the specific object query with which it is associated. For example, news headlines may be provided related to the object search query or results, whereas an advertisement may be provided based on settings provided by a user, or vice versa. The format of the metadata window may be partly or completely configurable by the user, or may be predetermined by the system.

While the disclosed system may generate object searches in response to user selection of an object, an alternative embodiment may generate at least some object queries prior to a user selection of an object. Such unsolicited object queries may, for example, be performed by a background process, in order to prefetch object search results.

The disclosed system may employ a variety of approaches to generate related metadata for a given search object within the metadata server or servers. Embodiments of the disclosed system may interface to and/or inter-operate with existing databases that associate objects such as words and/or phrases with specific URLs indicating the location of various types of content on the Internet. Such content may, for example, include HTML documents, graphics, video and/or audio, etc. Such existing databases include search engines, Web pages such as the Internet Movie Database (IMDB.COM), indexes, electronic news feed services, and directories for the Web. In the disclosed system, these databases can be used to supply metadata for metalinks. The disclosed system, running on the client and/or server system, can automatically supply a search input for these databases based on a search object selected by the user.

Embodiments of the disclosed system may utilize various techniques to improve the relevance of search results obtained from various databases. For example, existing search engines may not have information available to them regarding a specific user conducting a specific search. Accordingly, if ten different users conduct a search for the search query "mustang" on an existing search engine, they will likely each be provided the same search results. In contrast, and due to the ability of the client software 10 to access, collect and interpret information regarding user behavior on the client system, possibly with the assistance of a server system used to process user profiles, the disclosed system can enrich information provided in the search query 30 shown in FIG. 1. For example, information relevant to an object search may reflect the location of content currently and/or previously selected by the user on client system 12, and/or any "theme" describing the purpose, nature or context of content stored on, or in association with, the client system 12. For example, words or phrases near or on the same page as the selected object, or within previously selected documents, can be used as a basis for context analysis, for example using Natural Language Processing (NLP) techniques. The results of such context analysis can be used to form "guesses" regarding the user's intent and/or objectives with regard to an object search. For example, these techniques might be employed to infer that when the user requests more information on the term "mustang", he is interested in the car rather than the mammal. This conclusion may be derived from the observation that the terms "Ford" and "car" also appear near the target object. These correlations may be established, for example, by processing a large number of web pages which pertain the a=Ford Mustang. A statistical analysis, for example, of this set of web pages may reveal that the proximal appearance of the words "Ford" and "car" around the word "mustang" strongly suggest the subject as that of the automobile.

Although the source of the query 30 is shown as a client computer system 12 in FIG. 1, this embodiment is shown only for purposes of illustration, and the present invention is not limited to such an embodiment. Accordingly, the search query 30 used in connection with the disclosed system may be generated by any type of system, including a client system, server system, network appliance, or other, and which may generally be referred to in this regard as an "originating system" of the query 30. The document from which the search query was generated may similarly be referred to as the "originating content" for the query. For example, if the originating content primarily or significantly stores information regarding horses, search results in the response 32 for a search query 30 including the term "mustang" might be skewed, either by software executing on the client or the server system, towards inclusion of other horse-related sites. On the other hand, if the originating site is considered to be more car-related than horse related, the search results in the response 32 might be filtered or otherwise prioritized to emphasize sites relating to Ford Mustangs.

Additionally, embodiments of the disclosed system may include other features used to build "intelligence" into the metadata search process and thereby improve the relevance of the related metadata provided in the response 32. For example, using the software 10 executing on the client system 12, the disclosed system can collect and analyze data that existing server-based search engines cannot access. In this regard, the software 10 may be employed to record how the user interacts with the Web page or pages associated with various metalinks. For example, the disclosed system may be used to record whether a user of the client system 12 chooses to follow a given metalink from among a number of related metalinks. Additionally, the client software may further be employed to record the occurrence of certain predetermined actions of the user, such as:

1) spending a significant period of time at a given Web site or Web page, 2) clicking on an existing link embedded within a Web site, 3) performing an object search from a Web site, 4) scrolling down a particular page at a Web site, or 5) performing any other action indicating a raised level of interest in a particular Web site.

In this way, the disclosed system may determine that the user deemed a particular Web site, page, document or piece of information relevant to his or her general interests, or relevant to the original search object, or relevant to the metalink from which it was reached. On the other hand, certain actions performed by the user may indicate that the user did not find a particular Web site or page useful. For example, if the user immediately clicks the "back" button on the browser after a Web page is downloaded, or closes the window displaying that Web page, an embodiment of the disclosed system may determine that the user found the Web page relatively less relevant or even irrelevant. Messages describing the Web site or sites a user has found to be more or less relevant can be transmitted by the software 10 to the server system 34, and used to weight entries within the metadata database on the server system 34. Such information may be used, either alternatively or in addition, to perform such weighting on entries of a metadata database stored within the client system. In general, the metadata database may be stored within the server and/or client system. Entries may be weighted with respect to an individual user, a subset of all users deemed to be similar, or all users of the system. Such information may also be used to modify specific search queries generated on the server system 34 in response to object search queries received from the client system 12. With regard to an individual user, such search result weighting may be performed with or without explicit permission from that user, and could be started and stopped explicitly by the user, in order to provide user control over when and where the relevancy analysis takes place.

In this way the disclosed system can be requested by a user to develop and store a "user profile" that applies intelligence on an individualized basis to the search process, for the benefit of the requesting user. Thus, a sports fan who frequently chooses sports-related links whenever he does object searches can be shown more sports-related metadata as the system starts to learn his preferences by detecting his browsing patterns.

Information regarding user activity may also be collected anonymously by the disclosed system for activities of a large number of users, and employed to weight entries in the metadata database, or tokens within search queries, on behalf of all users, or only for those users requesting search results reflecting such aggregate "perceived relevance" bias, for example by clicking on a button within the user interface. In this way, through aggregated feedback provided by large numbers of users over time, the database of metadata on the server 34 can grow more and more "intelligent". Groups of individual users having similar usage patterns may also be grouped together in order for an embodiment of the disclosed system to share user-specific behavior feedback data across the group, thus creating a powerful combination of anonymous group feedback data and personalized feedback data.

In one illustrative embodiment, the client software 10 further includes an Artificial Intelligence ("AI") engine 42, which learns to interpret content based on previous documents visited by each user. In this way, the disclosed system may predict the behavior and wishes of a specific user sufficiently to offer intelligent "guesses" as to the kinds of information in which the user is interested. This relevancy information may then be fed back to a database on the metadata server, and used to modify the contents of the database and/or provide weightings or modifications to be applied to specific search objects.

The ability of embodiments of the disclosed system to collect and report certain kinds of user-behavior results stems from the fact that the client software 10 executes on the client system 12. In contrast, collection of user-behavior data would be difficult, if not impossible, for existing Web-server based search engines. Embodiments of the present system may exploit the fact that the software 10 executes on the user's "desktop", and can thus detect events indicating relevant user actions, such as where (or even whether) the user moves his mouse around on a current Web page, whether he clicks on a link or performs another object search on the current Web page, scrolls down the current Web page, spends a great deal of time on a given Web page, etc. Similarly, this analysis can be extended to cover user interaction with other software systems and data resident on the client system. This behavioral feedback data can be aggregated, interpreted, and applied in powerful and unprecedented ways to improve future searches. Thus it is shown that, in order to optimize the efficacy of searches for related metadata, a combination of aggregated feedback for all users, user behavior profiles, and origination site information can advantageously be used to provide related metadata.

The database(s) used on the server system 34 to store and access related metadata resulting from object searches may also be loaded based on submissions of Web site information from the publishers of Web sites. For example, related metadata may be loaded into such databases in association with specific URLs or other search objects at the request of publishers and/or hosts of the Web sites indicated by such metadata, or related to such search objects. In addition to installing related information from participating Web sites, the metalink object list itself can be supplemented by those Web sites. Users may visit such a Web site and be induced to "install" the set of related information from that website. From that point on, that user's metalink highlighting may include those terms installed from said Web site, and information related to those terms will include that published by the same Web site.

In one embodiment, the disclosed system combines the above mentioned user-behavior feedback with a capability to receive URLs from users that are intended to "challenge" the metadata automatically generated by the disclosed system in response to an object search for a given search object. For example, if a Web site contains resources (e.g. web pages or URLs) primarily related to gardening, the publisher of that site may submit it to the disclosed system with the desire that users performing object searches on some predetermined gardening related objects (such as "roses") will be displayed a link to that site as part of the related metadata. In an illustrative embodiment, the disclosed system may provide a "challenger" portion of the metadata window presenting the names of challenger resources associated with an object search. Such a "challenger" list may include some number of challenger resources provided by Web site providers, that are "challengers" to the main or "incumbent" metadata provided by the object search. The user may then decide whether to follow one of the ordinary metadata resources selected by the system or one of the "challenger" resources. For example, the aforementioned Web site pertaining to gardening may appear as a "challenger" metadata resource, meaning that any time a user performs an object search on roses, that site will appear in a special "challenger" category displayed within the metadata window. The disclosed system subsequently employs user-behavior feedback and/or explicit feedback (e.g., voting), to rate all metadata, including challenger metadata. If a "challenger" Web site performs relatively well, in the sense that the disclosed system detects a sufficient level of user activities indicating it is often relevant to user needs, then the challenger site may become "weighted" in the metadata database to such an extent that it appears in the main metadata results for the "rose" search object.

Placement of a Web site, and/or relative ordering of Web sites within search results for a given set of one or more search objects may also be predetermined in response to payments made for specific placements and/or ordering. For example, when users search on the word "car", various car-related Web sites appear as metadata within the metadata window. A particular car-related site, however, could purchase the right to have its Web site's URL automatically appear among the related metadata for the object "Cadillac", even if that Web site would not normally be selected for display to the user. This would enable companies to "purchase" certain keywords as search objects, and thus ensure that their Web site appears whenever someone does a related object search. In other words, the amount of money paid by such a company could be used to "weight" that company's metadata in the system's decision about which metadata to display to the user for a given object search. In one embodiment, the disclosed system allows real-time communication between a current Web site and the client system, such that the Web site could dynamically control the behavior of the client system. For example, the Web site could ask that a predetermined icon with a predetermined meaning, such as a red star meaning "special information", appear next to a specific metadata entry, or it could suppress the appearance of a competitor's link within the metadata.

In one embodiment, the client software 10 is automatically started when the client system 12 boots, and is capable of injecting itself into the address space of various software applications on the client system 12, including the Web browser 14. Examples of the Web browser 14 include Internet Explorer provided by Microsoft Corporation, as well as Netscape Navigator provided by Netscape Corporation.

The client software 10 operates to intercept the internal operations of the browser 14. For example, the client software may monitor the content of a Web page as it is downloaded by the browser 14 for display to the user. Such monitoring may, for example, be accomplished through an Application Program Interface (API) provided by the browser 14, or through various other techniques. For example, the client software 10 may read the HTML document source text describing a Web page being downloaded by the browser 14 by intercepting network packets received by the client system 12, or by intercepting read operations generated by the browser 14 to a local file system on the client system 12, for example when loading the HTML document from a local cache. The client software 10 may also be embodied to intercept various user inputs to the browser 14, for example by acting as a filter for mouse movement, mouse button and keyboard input. Windows related messages and/or operating system (OS) system calls may also be processed by the client software 10 before being relayed to the browser 14 through a variety of intercepting techniques, including, but not limited to, a combination of application and operating system component intercommunication interception.

Further during operation of the client software 10, an internal representation 40 is generated, representing the structure of a downloaded Web page associated with the HTML file 13, including image data, textual content, metalink objects within the Web page, etc. The client software 10 further operates to differentiate content from layout information and extract text from within the downloaded Web page, and may use probabilistic/statistical natural language processing algorithms to build a set of contextual information from the page.

The client or server builds and stores a database or "dictionary", for example either locally in the computer's memory, or remotely on a server system, of information that it may use to specify object-metadata associations. For example, as shown in FIG. 1, the client software 10 may generate the dictionary 22, storing possible keywords or other objects which may be used as inputs to "object searches." The client can parse the text and other objects on the page and determine which objects (phrases, words, e.g.,) should be indicated as metalinks. It can accomplish this by analyzing these objects along with the database and/or dictionary, possibly employing natural language processing and related algorithms to "make sense of"/"disambiguate" the objects on the page. The dictionary may be augmented and updated in response to such analysis through direct or indirect user input and/or via communications with a networked server. To reduce latency associated with network communication, and/or the amount of data transmitted across the network, the dictionary may be partially or totally stored on the client. To allow for the object database and metadata associations to change over time, any such client dictionary could be periodically synchronized with data stored on servers. For example, when objects and metadata are delivered to the client, the client could associated with each piece of data the exact time and date that data was received, or is expected to expire. The client could check this list before checking with the server(s), and only pass requests to the server which could not be satisfied with timely information on the client. Periodically, the client and server could communicate so as to verify that information stored on the client is still deemed current by the server.

The client system 12 may further operate to contribute user-profile data to a central database residing on one or more network servers, such as server system 34. Server systems which operate as a central database are repositories of information about the "surfing" habits of many users of the system, and allow one user to take advantage of another user's experiences. The central repository need not identify individual users by name, and can thus operate while preserving the anonymity and privacy of the people behind the data, unless those users elect to be part of an open "community", thus permitting other users within the community some form of access to their user profile information.

The client software 10 may operate to develop a set of contextual data, in response to the contents of a downloaded Web page, that may be used to help determine either which objects within a document are to be visually indicated as metalinks, or to help determine which specific metadata is provided in response to an object search. For example, a basic set of such contextual data may be determined relatively quickly, immediately after the Web page has been successfully loaded by the browser 14. Multiple databases, indexes, and/or search engines may then be queried in parallel using such contextual data, and the results compared, filtered, and weighted based on information stored at either the client system 12, and/or the server system 34. Such contextual information may be sent to one or more application Web server systems, which may include, interface to, and/or employ multiple information resources, such as server databases and/or Web search engines to retrieve data related to the contextual information. In this way the client software 10 is able to develop context based inputs to a search system or database related to the current content of a Web page, and requiring minimal input from the user. However, the inputs to the search engines and/or server side databases may be further defined and filtered by the user.

For example, the user may put the client software 10 into "input" mode by either a right-click menu option, a task bar icon being clicked, double clicking of a user interface display object such as a button, a "glick" consisting of a particular pattern of mouse movement, such as three clockwise circles, or some other user interface technique. The client software 10 may, for example, process these inputs by interposing itself between the operating system and the browser 14 on the client system 12. After putting the client software into the input mode, the user may highlight (select) textual and other data from the Web page being viewed, and then invoke the client software 10 to apply the selected data as a search object for the disclosed system to use when retrieving any related information that may be available to and/or maintained by the disclosed system. Related information may, for example, be obtained from a data base maintained by or accessible to the disclosed system, and/or through other search engines. The user's selection determines what keywords and/or search query terms are employed by the disclosed system to obtain any related information.

Once a search object has been selected by the user on the client system 12, the client software 10 may contact the server system 34, which initiates a search for relevant information. The client software 10 may use HTTP via its own pool of network connections. The client software 10 may, for example, interrogate the browser 14 for any relevant configuration information regarding proxy servers, so that the client software 10 is able to successfully complete an HTTP request to the Internet. Although the communications protocol employed by the client software 10 in an illustrative embodiment may be HTTP, the returned document may be HTML, or XML, or some other kind of proprietary text or binary format, as appropriate to the specific application.

The server 34 may return an HTTP response that comprises an index of related pages and/or topics. This data is machine readable and is to be interpreted by the client software 10 in order to generate the metadata presented to the user on the client system 12. The client software 10 interprets the data in the HTTP response, and creates a metadata GUI for the user on the client system 12. The metadata GUI may be a popup menu, or a pop-up window containing a graphical list of search results that the user may select with the keyboard or mouse in order to load an associated page onto the client system 12.

The server system 34 may form topics that reflect current research topics that are being investigated by significant groups of users. As multiple search queries arrive at the server system 34 from multiple clients such as the client system 12, the server system 34 may organize and categorize the search queries into topics, and provide real time feedback to multiple on-line users that reflects the availability of information related to such topics, which are likely to be of interest to many users. The disclosed system may further dynamically update the contents of the object search database in real time to reflect such dynamically generated topics, such that information related to a topic may be returned to a user who selected a search object related to that topic. For example, as a large number of users investigate a current major news story, the disclosed system may detect a significant amount of activity, across multiple users, and related to the news story. Such detection, for example, may be performed within the server system 34 in response to the content of multiple object searches. In the case where the relative volume of searches related to the new story reaches a predetermined threshold, the disclosed system, possibly with the assistance and/or intervention of a human operator, may define a "topic" for the story. The topic may then be used to organize entries in the metalink database, and thereby weight the probability of pages and/or documents related to the new story being reported as metadata related to subsequent object searches. The newly generated topic may then be further refined in real time to allow surfers using the client software to take advantage of other surfer's topics of interest. This aspect of the disclosed system addresses the problem of existing search engines that fail to provide any emphasis on the most recent topics of interest, and therefore often provide outdated search results. In this way, the disclosed system can respond dynamically to provide metadata which reflect recent activities of users, such as large numbers of searches related to a breaking news report.

As mentioned above, the client software 10 is able to cause an entry in the search engine database on the server system 34 to be "weighted" to reflect its usefulness based on (a) contextual data extracted from other pages downloaded onto the client system 12, (b) the amount of time that a page associated with the entry was viewed by the user on the client system 12, (c) repeat visits to the page associated with the entry, and other criteria. The client software 10 may further also employ techniques to 1) determine whether and how the mouse is being moved over a page in order to infer either that the page is being actively read, or, in the case where the mouse is inactive for some period of time, that the user has possibly walked away from computer;

2) determine whether the page is in the currently active window or has been covered by another window;

3) determine whether the page has been minimized; and 4) determine whether the user is scrolling the page.

Other techniques for determining the perceived relevance of a given page may also be employed. For example, in the case of a hand held wireless device, such as a personal digital assistant (PDA), the disclosed client software may monitor such events as whether stylus is currently being used. The client is able to intercept this information because it has injected itself into the browser's address space and can intercept the browsers function calls to the operating system, the browser's network communications, and disk activity.

The client software 10 may, for example, run as its own process, and therefore be capable of intercepting the activities of many browsers executing on the client system 10. Similarly, the client software 10 may also operate to intercept activities of other applications executing on the client system using similar techniques. Accordingly, the client software 10 may operate to intercept the activities of email clients, word processors, and other applications executing on the client system 12, all of which may act as input to the search system, in order to provide contextual weighting for entries in the metadata search database, and/or as a basis for structuring subsequent object searches themselves.

In an illustrative embodiment, an interface may be provided to the disclosed system which permits the metadata search database to be "seeded" by an administrator. Through such an interface, an "editorial view" may be imposed on the metadata search results, and a number of topics explicitly created by a system administrator, rather than by the relatively slower process of analyzing user habits. For example, when a major news story breaks, a system administrator might create a topic containing keywords for that story. The topic would further be associated with a set of metadata, which would be provided in response to an object search including any of the keywords for the story.

Figure 2:
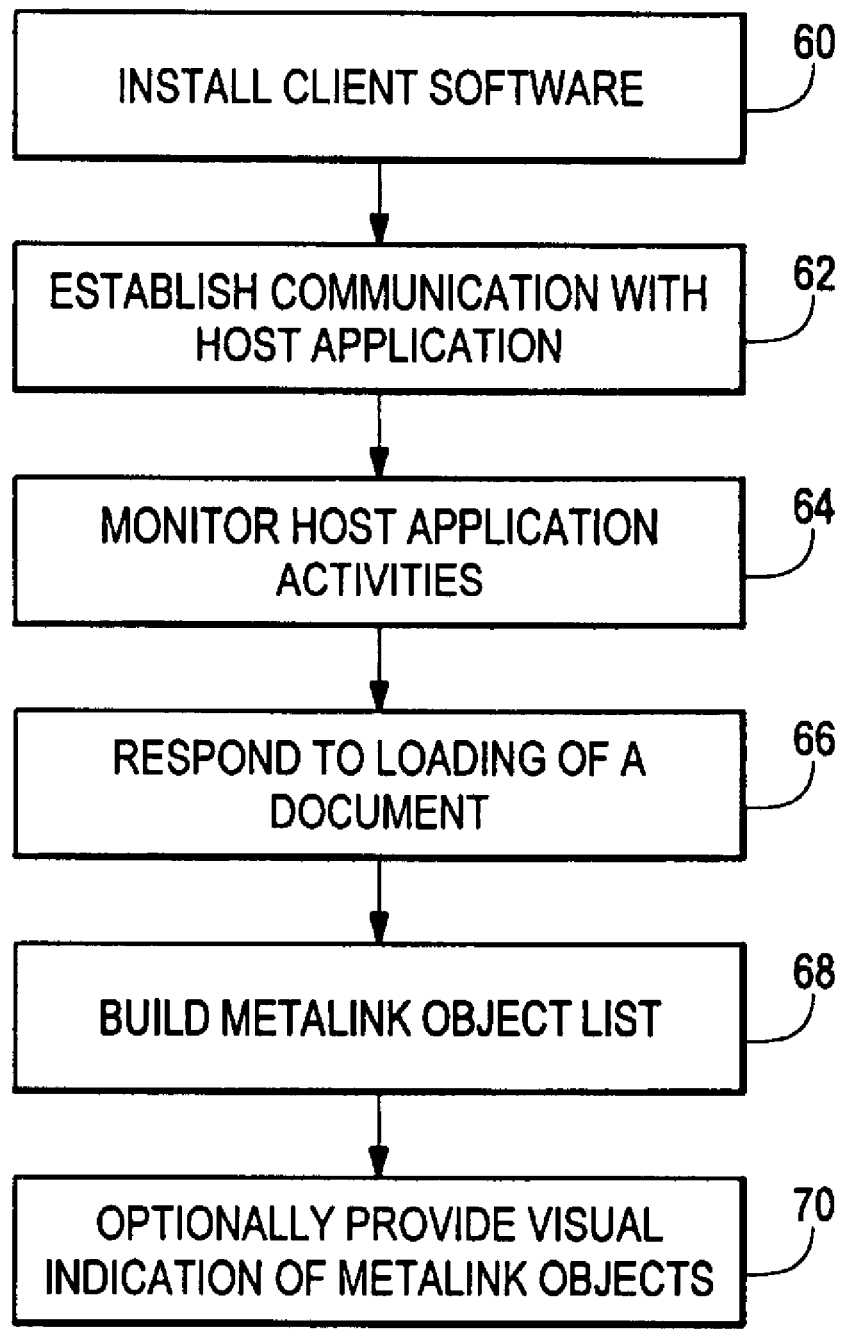
FIG. 2 is a flow chart showing steps performed in an illustrative embodiment of the disclosed system to obtain and indicate to a user a number of metalinks for a Web page downloaded to a client system.

FIG. 2 shows a number of steps performed by an illustrative embodiment of the disclosed system. As shown in FIG. 2, at step 60 the client software is installed on the client system, such as a personal computer, and configured to start up at system boot time and run in the background. At step 62, in response to a boot of the client system or some other trigger event, the client software interacts with a programming interface provided by, or injects itself into the execution context of, an application program also executing on the client system, for example a browser program, so as to provide a method of interprocess communication or interaction between the disclosed system and the host application. At step 64, the client software monitors actions performed by the browser, for example by intercepting browser related actions such as browser function calls, browser related network traffic, and/or browser disk accesses.

At step 66, the client software reacts to the downloading of a Web page by the browser, for example by parsing text and other data contained within the Web page. This parsing is performed in order to identify which content objects within the page are potentially metalink objects, and also to determine context information with regard to the page.

At step 68, the client software builds a list of metalink objects, such as keywords, phrases, and images, contained within the downloaded Web page that should be indicated as metalinks to the user, and also the markup style to be applied to each object (if any). Such a list of metalink objects may be generated in a variety of ways. For example, the client software may generate a unique word list based on the contents of the downloaded Web page, and then send that list to the metadata server. The metadata server may then provide a list indicating the words within the unique word list for which metadata is available through the metadata server. Alternatively, the client software may automatically select a number of metalink objects within a Web page when the Web page is downloaded, in response to a Natural Language Processing (NLP) subsystem that "reads" the text of the downloaded Web page and picks out significant subject matter and proper nouns, and compares it to a local database of such subject matter. Alternatively, the client software may just send the URL of the target page, along with contextual information supplied by the user's browser (e.g. cookies, user agent, HTTP header information), so that the server system can independently retrieve and analyze the page. Such automatic generation of a list of metalink objects by the client system may also be provided in response to the client software operating to break down the text of the downloaded Web page into tokens, and then transmitting those tokens to a metadata server that looks each one up in a database to determine whether any associated metadata exists.

In a further alternative embodiment, the initial list of metalink objects may be generated by comparing objects within the downloaded Web page to entries in a dictionary of potential metalink objects stored on the client system. While an initial list of metalink objects may be generated on the client system without reference to the metadata server system, the client system may subsequently send the initial set of metalink objects for the Web page to the metadata server, which may then analyze the metalink object list for contextual meaning, and/or to determine whether any metadata in fact exists for each of the metalink objects in the list. Indication of whether metadata exists may be provided by the metadata server to the client system, which may then modify the list of metalink objects for the Web page to only include objects for which metadata definitely exists. Such an implementation would allow the data storage responsibilities of the disclosed system to be shared between the client and server, and also for the division of data between client and server to be optimized, perhaps automatically, over time, so as to minimize latency from the user's perspective associated with any data access. Accordingly, the list of metalink objects generated at step 68 may consist of objects for which metadata is definitely available and may be obtained through the metadata server, or for which metadata may potentially exist, and which may be considered especially relevant to the user, or to the subject matter of the current or recently downloaded Web page or pages.

The user can activate the client software at step 70 to provide visual indication of the metalink objects in the list generated at step 68, for example by clicking on a button GUI object provided by or on behalf of the client software by right clicking on the mouse, or through some other predetermined user input. Activation of the client software to indicate metalink objects within the current Web page may alternatively or additionally be performed using a predetermined mouse movement, referred to as a "glick" of the mouse, or some other type of predetermined type of mouse manipulation. Indication of metalink objects in the list generated at step 68 may consist of a change in the format and/or display of objects. For example, the client software may cause the metalink objects identified in step 68 to be visually identified by underlining them, changing their color, highlighting them, or through any type of format change which points out to the user those metalink objects in the current display of the Web page, and also conveys to the user information about that object or its related metadata. The list of metalink objects may also be displayed to the user as a list within a side frame or another window within the user interface. Indication of metalink objects may also be performed in response to the user moving the mouse over or near individual ones of the metalink objects, for example by changing the appearance of the cursor under those circumstances.

The client software may locate the HTML code corresponding to any metalink objects in the displayed document in order to modify the display of those objects. For example, the client software may intercept the HTML at load time, before the Web page is displayed, and insert tags to highlight the metalink objects. For example, the client software may insert a tag <b> around the metalink object so as to cause the text to appear in boldface.

Figure 3:
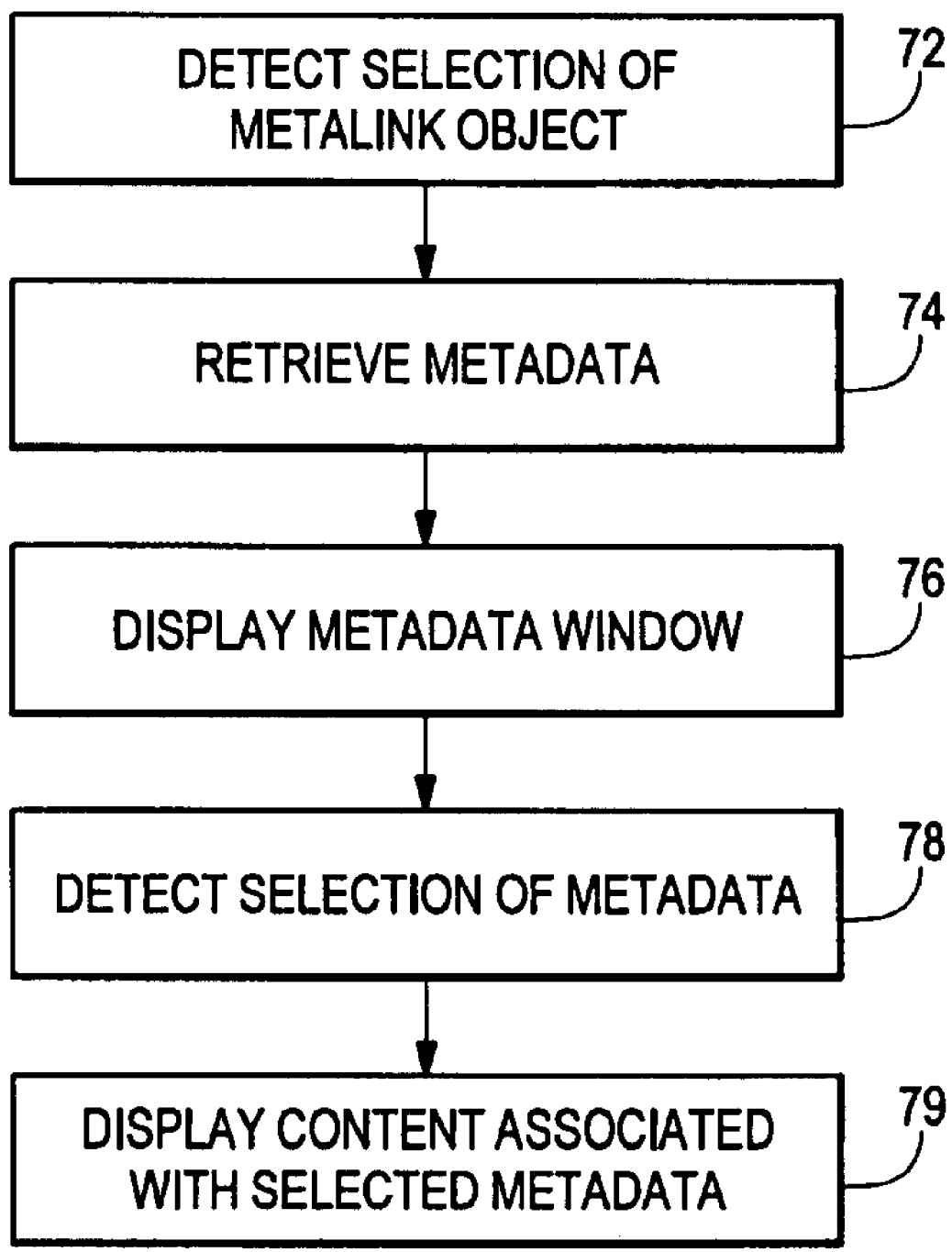
FIG. 3 is a flow chart showing steps performed in an illustrative embodiment to provide metadata to a user of a client system.

As shown in FIG. 3, the client software detects when the user selects one of the metalink objects in the currently displayed Web page at step 72. User selection of a metalink object may be performed by various mechanisms, such as the user clicking on the metalink object, hovering the mouse over the object, or performing a glick in proximity to the metalink object. In response to the detection of the selection of the metalink object at step 72, the client software retrieves any metadata from the metadata server at step 74. The client system displays the retrieved related information to the user at step 76. In an illustrative embodiment, the client software provides a search of a remote database using the object selected at step 72. Alternatively, a back-end proxy may be provided to enable the client software to query multiple search engines, databases or indexes in parallel.

The retrieved metadata may be displayed using some specific form of pop-up window, such as a cartoon thought bubble connected to the selected metalink object. At step 78, the client software detects an event indicating that the user has selected a URL from within the metadata displayed to the user at step 76, for example by clicking on the URL in the generated metadata window. The content associated with the selected metadata may then either be displayed to the user through the client software at step 79, or, in the case where the selected metadata indicates a Web page, downloaded to the client system through the browser.

Figure 5:
FIG. 5 shows the Web page of FIG. 4 after the user has clicked on the "Stanley Kubrick" metalink, whereupon a new window (the metadata window) has been generated containing information about related links.
Figure 6:
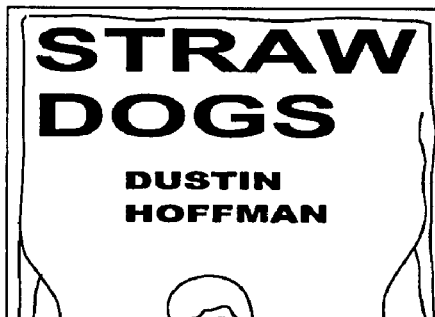
FIG. 6 shows the Web page of FIG. 5 after the user has moved the mouse from the "Stanley Kubrick" metalink to the window of related information (metadata)
Figure 7:
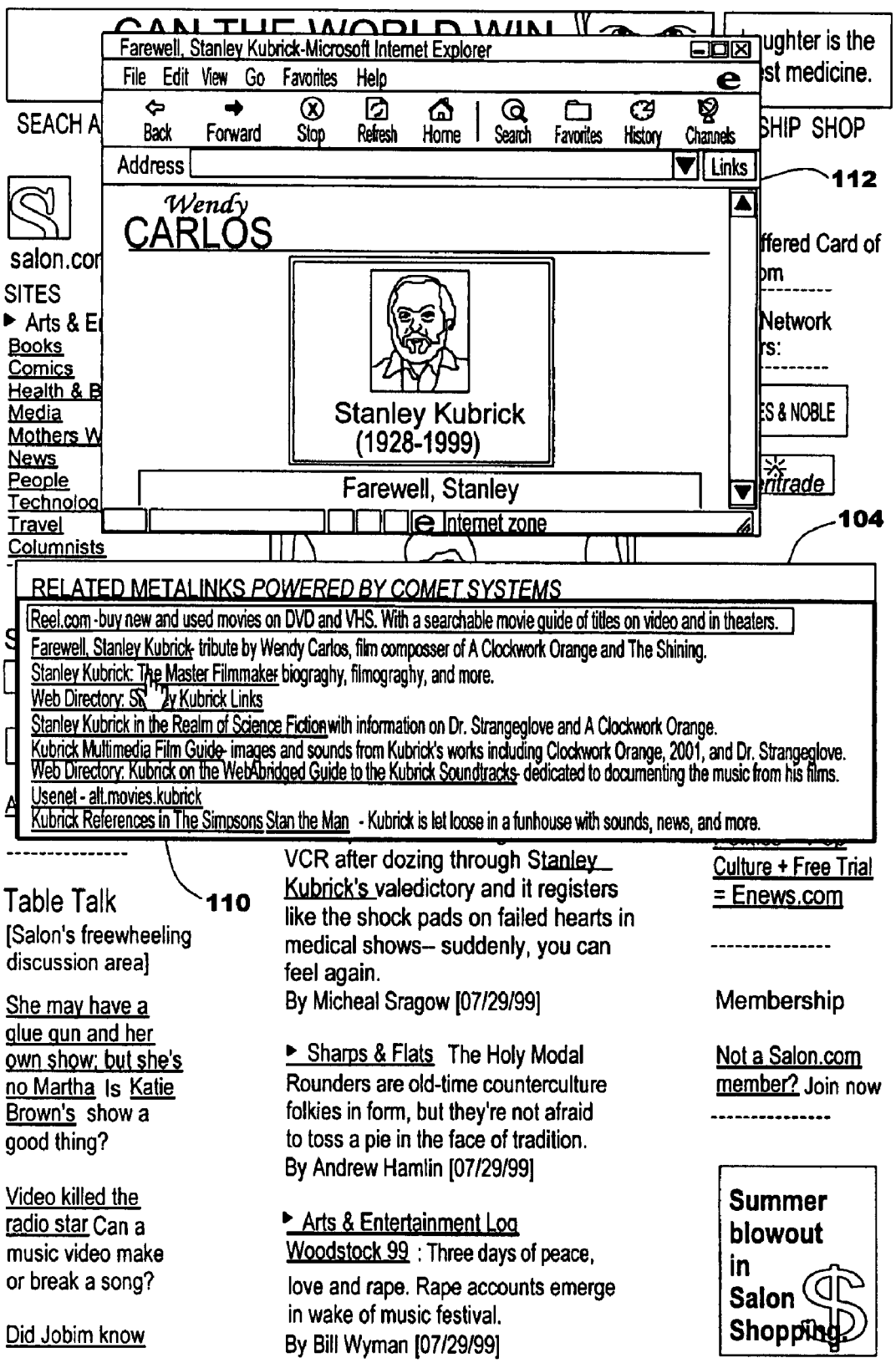
FIG. 7 shows the Web page of FIG. 6 after the user has clicked on the "Farewell, Stanley Kubrick" link within the metadata window, whereupon a new window has been generated showing the selected Web page.

FIG. 4 shows a Web page with illustrative metalink objects 100 indicated to a user using a distinctive visual indication, in this case, underlining. For purposes of illustration, the distinctive visual indication of the metalink objects 100 is shown as underlining. Note that the invention does not require that metalink objects be distinctively identified. Such identification (or the lack thereof), and the meaning of any particular markup style, could be configurable by the user or defined by the software system. Indeed, it is possible that literally every object on the page is a metalink. The underlining of metalink objects as shown in FIG. 4 may employ a distinctive color of underlining, such as yellow. Note that the distinction attributed to the object may vary based on the type of object, what the object represents, or what sort of related information is available for the object. Again, this behavior may be specified by the user, or defined by the software system. The visual indication of the metalink objects 100 may further be provided, alternatively or in addition, by modification of the cursor when the cursor is passed over or near a metalink object. Alternatively, the visual indication may be explicitly activated by the user. For example, by clicking the right mouse button of the mouse, or clicking a button placed in a menu of the browser. As also shown in FIG. 4, when a user has moved the cursor over or within some predetermined distance of one of the metalink objects, the cursor may be modified to indicate the presence of a metalink object. As shown in FIG. 4, in response to the user having moved the cursor within a predetermined distance from one of the metalink objects 100, the cursor has been changed from an arrow into a yellow "hyperlink hand" 102 to indicate that "Stanley Kubrick" is a metalink. FIG. 5 shows the Web page of FIG. 4 after the user has clicked on the "Stanley Kubrick" metalink, whereupon a new metadata window 104 has been generated containing information about related metadata. While FIG. 5 shows the metadata for the search object provided within a separate window, the related metadata may alternatively be provided within the same window that the current Web page is being displayed within. FIG. 6 shows the Web page of FIG. 5 after the user has moved the yellow hyperlink-hand mouse away from the "Stanley Kubrick" metalink to the metadata window of related information. Accordingly, the mouse has changed to a normal hyperlink hand 106, since it is no longer over a metalink object within the Web page. FIG. 7 shows the Web page of FIG. 6 after the user has clicked on the "Farewell, Stanley Kubrick" data source 110, whereupon a new window 112 has been generated showing the Web page associated with the selected metadata data source.

The invention is not limited in application to content provided through Web pages. The disclosed system may be applied to email documents, for example. For example, with existing systems, if a first user wants to tell a second user about a new company, the first user might send the second user an email describing the company along with the URL of the company's Web site. With the disclosed system, rather than the first user typing in the URL of the company's Web site, if the invention software is running on the second user's computer, the second user can simply conduct an object search on the name of the company. Among the related metadata that appear might be the company's Web site. Other metadata might also appear, providing the second user with a rich choice of metadata resources should he want to get more information about that company. The present invention may be applied beyond the Web, and beyond email, to any applications that employ parsable content (i.e., text, video, graphics, etc.), such as word processors, spreadsheet programs, as well as applications which process multimedia content, and in which users may desire to see information that is related to a given object within the parsable content.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to use with a browser application program, the present invention is generally applicable to any type of program provided to a computer system. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method of enabling information associations, said method being performed in conjunction with at least one client system and at least one server system, said method comprising the steps of:

in a first accessing step, accessing, at said client system, at least one document, said document containing informational content and having an associated address for use in accessing said informational content, wherein said first accessing step includes accessing said informational content using said address, said informational content including parsable data;

in a parsing step, parsing, on one of said client system and said server system, said parsable data included in said informational content to identify a number of objects included in said document;

in a second accessing step, accessing, from at least one database, information related to those of said identified objects included in said document for which related information is available;

in a first displaying step, displaying, on a display of said client system, at least some of those of said identified objects for which related information is available;

in a detecting step, detecting, on said client system, a selection, by a user, of one of said objects displayed on said display; and in a second displaying step, displaying, on said display, information from said at least one database related to said selected one of said objects.

2. The method of claim 1, wherein said first displaying step comprises displaying said document including said objects, and providing visual indications to said user of at least some of those of said objects for which related information is available.

3. The method of claim 1, further comprising:

detecting an operation in which said document is being loaded by an application program; and wherein said second accessing step comprises comparing said objects within said document with entries in said at least one database, said second accessing step being performed in response to said detecting of said operation in which said document is being loaded by said application program.

4. The method of claim 3, wherein said second accessing step further comprises accessing, from said at least one database, information related to at least one of said objects within said document in the event that said at least one of said objects within said document matches at least one of said entries in said at least one database.

5. The method of claim 3, wherein said loading of said document by said application program comprises downloading of said document onto said client system using a browser program.

6. The method of claim 3, wherein said loading of said document into said application program comprises loading said document into a word processor program.

7. The method of claim 3, wherein said loading of said document into said application program comprises loading said document into an email program.

8. The method of claim 1, wherein said information from said at least one database related to said selected one of said objects comprises at least one indication of at least one related resource, and further comprising:
- detecting a selection of said indication of said at least one related resource by said user; and
- outputting content associated with said at least one related resource in response to said detecting said selection of said indication of said at least one related resource.

9. The method of claim 8, wherein said at least one indication of said at least one related resource comprises at least one uniform resource locator associated with said at least one related resource.

10. The method of claim 8, wherein said at least one related resource from said at least one database comprises streaming audio information.

11. The method of claim 8, wherein said at least one related resource from said at least one database comprises streaming video information.

12. The method of claim 1, further comprising:
- in a monitoring step, monitoring user activities on said at least one client system, said user activities indicating levels of interest of at least one user of said at least one client system in said objects included in said document;
- determining at least one rating of at least one of said document, said objects, and said information related to said objects in response to said monitoring of said user activities on said at least one client system; and
- storing said at least one rating in association with at least one of said at least one user, said document, said objects, and said information related to said objects, wherein said at least one rating can be applied to future requests for information related to said objects.

13. A computer program product including a computer readable medium, said computer readable medium having program code stored thereon, said program code comprising:
- first program code for accessing, at least one client system, at least one document, said document containing informational content and having an associated address for use in accessing said informational content, wherein said first program code for accessing at least one document includes program code for accessing said informational content using said address, said informational content including parsable data;
- program code for parsing, on one of said at least one client system and at least one server system, said parsable data included in said informational content to identify a number of objects included in said document;
- second program code for accessing, from at least one database, information related to those or said identified objects included in said document for which related information is available;
- first program code for displaying, on a display of said client system, at least some of those of said identified objects for which related information is available;
- program code for detecting, on said client system, a selection, by a user, of one of said objects displayed on said display; and
- second program code for displaying, on said display, information from said at least one database related to said selected one of said objects.

14. The computer program product of claim 13, wherein said first program code for displaying comprises displaying said document including said objects, and providing visual indications to said user of at least some of those of said objects for which related information is available.

15. The computer program product of claim 13, further comprising:
- program code for detecting an operation in which said document is being loaded by an application program;
- wherein said second program code for accessing comprises comparing said objects within said document with entries in said at least one database, said second program code for accessing being executed in response to an execution of said program code for detecting said operation in which said document is being loaded by said application program.

16. The computer program product of claim 15, wherein said second program code for accessing further comprises program code for accessing, from said at least one database, information related to at least one of said objects within said document in the event that said at least one of said objects within said document matches at least one of said entries in said at least one database.

17. The computer program product of claim 15, wherein said program code for detecting said operation in which said document is loaded into said application program comprises program code for detecting downloading of said document onto said client system through a browser program.

18. The computer program product of claim 15, wherein said program code for detecting said operation in which said document is loaded into said application program comprises program code for detecting loading of said document into a word processor.

19. The computer program product of claim 15, wherein said program code for detecting said operation in which said document is loaded into said application program comprises program code for detecting loading of said document into an email program.

20. The computer program product of claim 13, wherein said information from said at least one database related to said selected one of said objects comprises at least one indication of at least one related resource, and further comprising:
- program code for detecting a selection of said indication of said at least one related resource by said user; and
- program code for outputting content associated with said at least one related resource in response to said program code for detecting said selection of said indication of said at least one related resource.

21. The computer program product of claim 20, wherein said at least one indication of said at least one resource comprises at least one uniform resource locator associated with said at least one related resource.

22. The computer program product of claim 20, wherein said related resource from said at least one database comprises streaming audio information.

23. The computer program product of claim 20, wherein said related resource from said at least one database comprises streaming video information.

24. The computer program product of claim 13, further comprising:
- program code for monitoring user activities on said at least one client system, said user activities indicating levels of interest of at least one user of said at least one client system in said objects included in said document;
- program code for determining at least one rating of at least one of said document, said objects, and said information related to said objects in response to said monitoring of said user activities on said at least one client system; and program code for storing said at least one rating in association with at least one of said at least one user, said document, said objects, and said information related to said objects, wherein said at least one rating can be applied to future requests for information related to said objects.

25. A system for enabling information associations, comprising:

at least one client system, said client system including a display;

at least one processor coupled to at least one memory; and an information association utility loaded in said at least one memory and executable on said at least one processor, said information association utility operable:

to access at least one document, said document containing informational content and having an associated address for use in accessing said informational content, said information association utility being further operable to access said informational content using said address, said informational content including parsable data;

to parse said parsable data included in said informational content to identify a number of objects included in said document;

to access, from at least one database, information related to those of said identified objects included in said document for which related information is available, to display, on said display, at least some of those of said identified objects for which related information is available;

to detect a selection, by a user, of one of said objects displayed on said display; and to display, on said display, information from said at least one database related to said selected one of said objects.

26. The method of claim 1, wherein at least some of said objects comprise respective metadata.

27. The computer program product of claim 13, wherein at least some of said objects comprise respective metadata.

28. The system of claim 25, wherein at least some of said objects comprise respective metadata.

29. The method of claim 1 further including determining said at least one of those of said objects for which related information is available based upon at least one of user profile information derived from past actions of said user, profile information provided by said user, preferences provided by said user, contextual analysis of said document, and related information associated with at least one of said objects.

30. The method of claim 29 wherein said contextual analysis of said document includes extracting themes contained in at least one of said document and a history of documents recently downloaded onto said client system.

31. The computer program product of claim 13 further including program code for determining said at least a some of those of said objects for which related information is available based upon at least one of user profile information derived from past actions of said user, profile information provided by said user, preferences provided by said user, contextual analysis of said document, and related information associated with at least one of said objects.

32. The computer program product of claim 31 wherein said contextual analysis of said document includes extracting themes contained in at least one of said document and a history of documents recently downloaded onto said client system.

33. The system of claim 25 wherein said information association utility is further operable to determine said at least some of those of said objects for which related information is available based upon at least one of user profile information derived from past actions of said user, profile information provided by said user, preferences provided by said user, contextual analysis of said document, and related information associated with at least one of said objects.

34. The system of claim 33 wherein said contextual analysis of said document includes extracting themes contained in at least one of said document and a history of documents recently downloaded onto said client system.

35. The method of claim 12 wherein at least one of said objects comprises at least one indication of at least one related resource, and wherein said monitoring step includes monitoring said user activities associated with said at least one related resource.

36. The computer program product of claim 24 wherein at least one of said objects comprises at least one indication of at least one related resource, and wherein said program code for monitoring user activities includes program code for monitoring user activities associated with said at least one related resource.

37. The method of claim 1 wherein said detecting step includes detecting said selection of said one of said objects displayed on said display by at least one of moving a cursor substantially over said one of said objects and leaving the cursor over said one of said objects for a predetermined amount of time, and clicking on said one of said objects.

38. The computer program product of claim 13 wherein said program code for detecting a selection of one of said objects displayed on said display by said user includes program code for detecting said selection of said one of said objects by at least one of moving a cursor substantially over said one of said objects and leaving the cursor over said one of said objects for a predetermined amount of time, and clicking on said one of said objects.

39. The system of claim 25 wherein said information association utility is operable to detect said selection of said one of said objects by at least one of moving a cursor substantially over said one of said objects and leaving the cursor over said one of said objects for a predetermined amount of time, and clicking on said one of said objects.

40. A method of enabling information associations on at least one client system, comprising the steps of:

accessing at least one document, said document containing informational content and having an associated address for use in accessing said informational content, wherein said accessing at least one document includes accessing said informational content using said address, said informational content including parsable data;

parsing said parsable data included in said informational content to identify a number of objects included in said document;

accessing, from at least one database, information related to those of said identified objects included in said document for which related information is available; and in a first displaying step, displaying, on a display of said client system, information accessed from said at least one database that is related to at least some of those of said identified objects for which related information is available.

41. The method of claim 40 further including, in a second displaying step, displaying, on said display, said at least some of those of said objects for which related information is available.

42. The method of claim 41 wherein said second displaying step includes displaying, on said display, said document including said objects in said document.

43. The method of claim 42 wherein said second displaying step includes providing visual indications of said at least some of those of said objects included in said document for which related information is available.

44. The method of claim 43 wherein said visual indications include at least one of boldfacing, underlining, color-coding, and changing at least one of a format, font, and style of said at least some of those of said objects included in said document for which related information is available.

45. The method of claim 40 further including determining said at least some of those of said objects for which related information is available based upon at least one of user profile information derived from past actions of said user, profile information provided by said user, preferences provided by said user, contextual analysis of said document, and related information associated with at least one of said objects.

46. The method of claim 45 wherein said contextual analysis of said document includes extracting themes contained in at least one of said document and a history of documents recently downloaded onto said client system.

47. A system for enabling information associations, comprising:
    at least one client system including at least one display;
    at least one processor coupled to at least one memory; and
    an information association utility loaded in said memory and executable on said processor, said information association utility being operable:
    to access at least one document, said document containing informational content and having an associated address for use in accessing said informational content, said information association utility being further operable to access said informational content using said address, said informational content including parsable data;
    to parse said parsable data included in said informational content to identify a number of objects included in said document;
    to access, from at least one database, information related to those of said identified objects included in said document for which related information is available; and
    to display, on said display, information accessed from said at least one database that is related to at least some of those of said objects for which related information is available.

48. The system of claim 47 wherein said information association utility is operable to display, on said display, said at least some of those of said objects for which related information is available.

49. The system of claim 48 wherein said information association utility is operable to display, on said display, said document including said objects in said document.

50. The system of claim 49 wherein said information association utility is operable to provide, on said display, visual indications of said at least some of those of said objects included in said document for which related information is available.

51. The system of claim 50 wherein said visual indications include at least one of boldfacing, underlining, color-coding, and changing at least one of a format, font, and style of said at least some of those of said objects in said document for which related information is available.

52. The system of claim 47 wherein said information association utility is further operable to determine said at least some of those of said objects for which related information is available based upon at least one of user profile information derived from past actions of said user, profile information provided by said user, preferences provided by said user, contextual analysis of said document, and related information associated with at least one of said objects.

53. The system of claim 52 wherein said contextual analysis of said document includes extracting themes contained in at least one of said document and a history of documents recently downloaded onto said client system.

* * * * *

UNITED STATES PATENT AND TRADEMARK OFFICE
CERTIFICATE OF CORRECTION

| | | |
|---|---|---|
| PATENT NO. | : 7,353,246 B1 | Page 1 of 1 |
| APPLICATION NO. | : 09/628880 | |
| DATED | : April 1, 2008 | |
| INVENTOR(S) | : James S. Rosen et al. | |

It is certified that error appears in the above-identified patent and that said Letters Patent is hereby corrected as shown below:

Column 9, line 48, "a=Ford" should read --Ford--;

Column 21, claim 13, line 54, "or" should read --of--; and

Column 23, claim 31, line 56, "a" should be deleted.

Signed and Sealed this

Second Day of June, 2009

JOHN DOLL
*Acting Director of the United States Patent and Trademark Office*